United States Patent [19]

Perkins

[11] Patent Number: 5,525,001
[45] Date of Patent: Jun. 11, 1996

[54] CLAMPING AND FASTENING APPARATUS

[75] Inventor: David J. Perkins, Ann Arbor, Mich.

[73] Assignee: Chrysler Corporation, Auburn Hills, Mich.

[21] Appl. No.: 312,372

[22] Filed: Sep. 26, 1994

[51] Int. Cl.[6] ............................................. F16B 5/02
[52] U.S. Cl. ........................... 403/157; 403/79; 403/388
[58] Field of Search ............................ 403/79, 157, 395, 403/398, 399, 386, 388, 213, 299, DIG. 9, 322; 411/383, 546, 537, 384

[56] References Cited

U.S. PATENT DOCUMENTS

| | | |
|---|---|---|
| 1,000,046 | 8/1911 | Stafford . |
| 1,958,497 | 5/1934 | Rivers . |
| 1,966,574 | 7/1934 | Wenneborg ............... 403/79 X |
| 2,509,285 | 5/1950 | Bendicsen ............... 403/157 X |
| 2,883,012 | 4/1959 | Hoffman . |
| 2,922,456 | 1/1960 | Kann . |
| 3,039,641 | 6/1962 | Rosan . |
| 3,110,524 | 11/1963 | Zeller et al. . |
| 3,362,737 | 1/1968 | Cobb . |
| 3,371,236 | 2/1968 | Swanke . |
| 3,428,842 | 2/1969 | Harris . |
| 3,538,362 | 11/1970 | Cheetham et al. . |
| 3,637,269 | 1/1972 | Lantry . |
| 3,693,247 | 9/1972 | Brown . |
| 3,747,168 | 7/1973 | Snarskis . |
| 4,108,407 | 8/1978 | Cable et al. ............... 411/384 X |
| 4,435,100 | 3/1984 | Cox . |
| 4,553,442 | 11/1985 | Mazzorana . |
| 4,747,737 | 5/1988 | Roffelsen . |
| 4,945,272 | 7/1990 | Ochi et al. . |
| 5,024,283 | 6/1991 | Deli ............... 403/79 X |
| 5,104,141 | 4/1992 | Grove et al. . |
| 5,228,795 | 7/1993 | Gray . |

*Primary Examiner*—Anthony Knight
*Attorney, Agent, or Firm*—Margaret A. Dobrowitsky

[57] ABSTRACT

A clamping apparatus used for improving the fastening of a mounting projection between proximal and distal flanges of a clevis. The proximal flange of the clevis has a hole, an inner side facing the distal flange, and an outer side. The clamping apparatus includes a threaded clamping plug sized to fit in the hole in the proximal flange and to abut the mounting projection when the clamping plug is in the hole in the proximal flange and the mounting projection is between the two flanges. Another embodiment is an apparatus for fastening a mounting projection to a structure. The fastening apparatus includes a clevis attached to the structure, the clevis having a proximal flange and a distal flange. The proximal and distal flanges each have a hole, an inner side, and an outer side. The fastening apparatus further includes a threaded clamping plug which is sized to fit in the hole in the proximal flange of the clevis and to abut the mounting projection when the clamping plug is in the hole in the proximal flange and the mounting projection is between the two flanges. The fastening apparatus further includes fastening means to urge against the proximal end of the clamping plug and the outer side of the distal flange of the clevis.

20 Claims, 2 Drawing Sheets

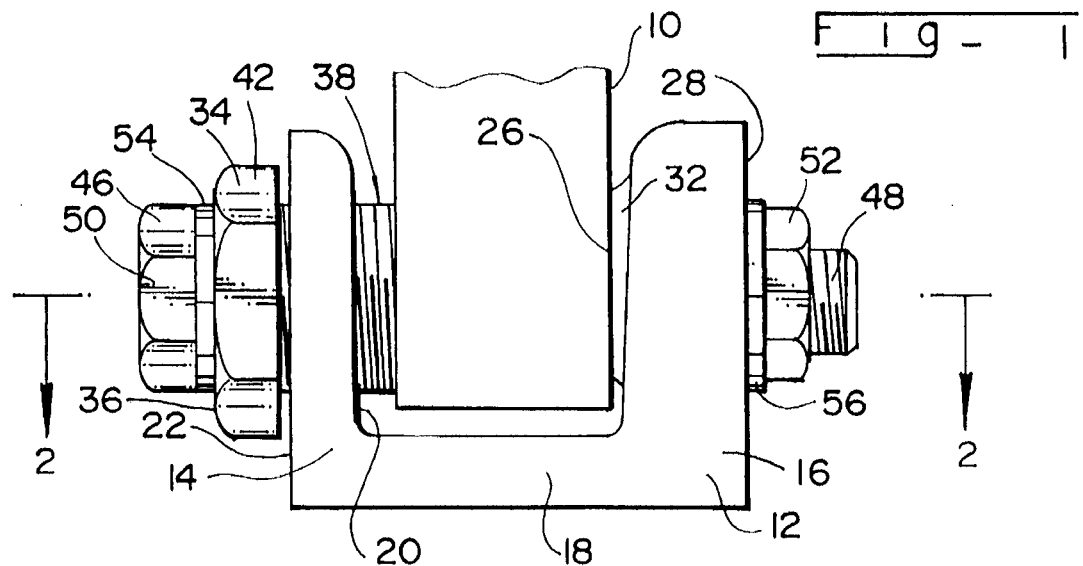
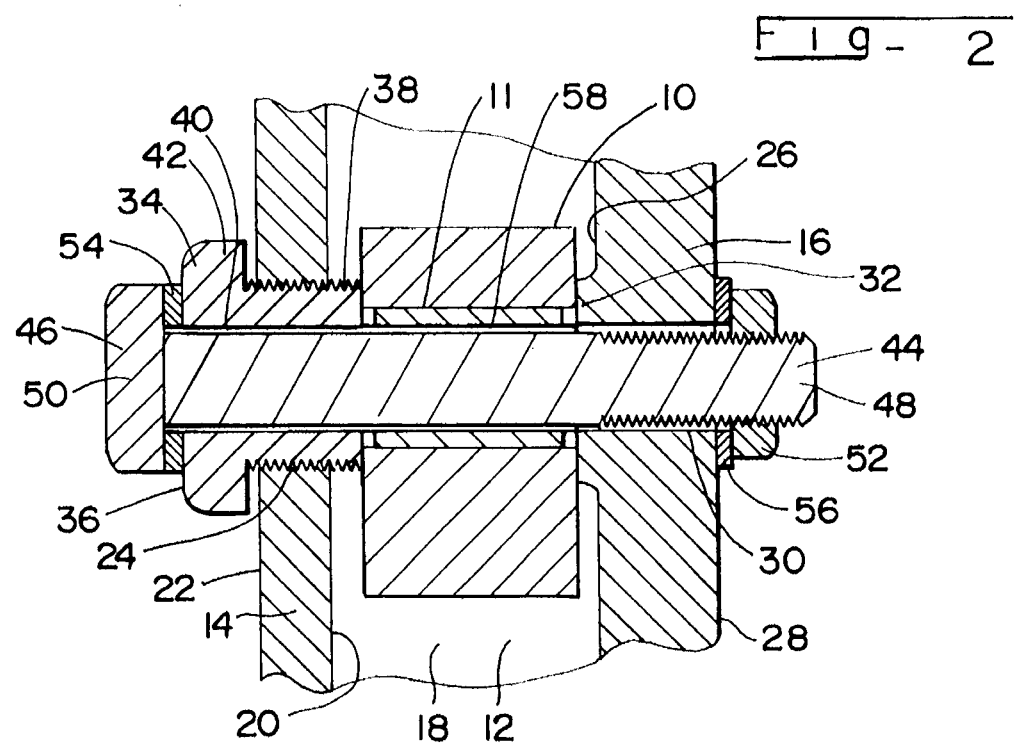

CLAMPING AND FASTENING APPARATUS

BACKGROUND OF THE INVENTION

1. Field of the Invention

The present invention relates generally to a clamping apparatus and an apparatus for fastening and, more particularly, to a clamping apparatus to be used with a clevis and to a fastening apparatus which apparatus includes a clevis.

2. Description of the Related Art

A clevis, i.e., a U-shaped shackle that has holes drilled in the ends or flanges of the "U" to receive a bolt, is often used in various industries for attaching one part to another. For example, in the automotive industry, automotive parts, such as motors, have been attached to rigid members, such as crossmembers, using clevis fasteners. In these instances, the rigid member has a rigid clevis attached thereto or integral therewith and the automotive part has a mounting projection with a hole drilled therethrough. To fasten the automotive part to the rigid member, the mounting projection is inserted between the flanges of the clevis so that the hole in the mounting projection is aligned with the holes in the flanges of the clevis so that a bolt or pin may be passed through the aligned holes.

In the past, to achieve a snug fit between the thing being mounted (the mounting projection) and the ends of the U-shape of the clevis, the distance between the ends of the "U" were designed and manufactured to be so close that the ends of the clevis "U" could be squeezed together during fastening to make the ends of the thing being mounted touch both sides of the clevis "U". This gave a snug fit.

However, such clevis fastening is not without its problems. Firstly, it is difficult to manufacture clevises with close tolerances in order to achieve such a close fit to the mounting projection. It is also difficult to assemble a mounting projection with a clevis when the clevis has such a close tolerance. In addition, when the clevis is rigid, it is difficult to squeeze the flanges to achieve the secure fit. Furthermore, deflection of the flanges during assembly causes undesirable stresses to the clevis, resulting in more failures of the clevis.

It is, therefore, one object of the present invention to provide a clamping apparatus to be used with clevis fasteners and a fastening apparatus which includes a clevis, which apparatuses preclude the need to deflect the flanges of the clevis in order to achieve a secure fit.

It is another object of the present invention to provide a clamping apparatus to be used with a clevis and a fastening apparatus which includes a clevis, which apparatuses allow greater tolerances on the distance between the flanges of the clevis.

It is yet another object of the present invention to provide a clamping apparatus to be used with a clevis and a fastening apparatus which includes a clevis, which apparatuses achieve a secure joint between two parts.

SUMMARY OF THE INVENTION

To achieve the foregoing objects, one embodiment of the present invention is a novel clamping apparatus to be used in conjunction with a clevis to ensure a snug fit. My clamping apparatus may be used for improving the fastening of a mounting projection between the proximal and distal flanges of a clevis. The proximal flange of the clevis includes a hole, an inner side facing the distal flange, and an outer side opposite the inner side. The clamping apparatus includes a threaded clamping plug being sized to fit within the hole in the proximal flange of the clevis, also abutting the mounting projection when the clamping plug is in the hole in the proximal flange, and the mounting projection is between the two flanges. My clamping apparatus allows greater tolerance between the two flanges, while reducing the need for squeezing the flanges of the clevis in order to achieve a snug fit between the mounting projection and the clevis.

A second embodiment of the present invention is a novel overall fastening apparatus for fastening a mounting projection to a structure, especially when the mounting projection has a hole therethrough. My novel overall fastening apparatus includes, among other things, a clevis attachable to a structure, the clevis having a proximal flange and a distal flange. The proximal flange has a hole, an inner side facing the distal flange, and an outer side opposite the inner side. The distal flange has a hole, an inner side facing the proximal flange, and an outer side opposite the inner side. The fastening apparatus further includes a threaded clamping plug which is sized to fit in the hole in the proximal flange of the clevis and to abut the mounting projection when the clamping plug is in the hole in the proximal flange and the mounting projection is between the two flanges. The fastening apparatus further includes fastening means to push against the proximal end of the clamping plug and the outer side of the distal flange of the clevis.

Other objects, features, and advantages of the present invention will be readily appreciated as the same becomes better understood after reading the subsequent description taken in conjunction with the appendant drawings.

BRIEF DESCRIPTION OF THE DRAWINGS

FIG. 1 is a side elevational view of my fastening apparatus which also includes one of my clamping apparatus made in accordance with the present invention;

FIG. 2 is a sectional view taken along line 2—2 of FIG. 1; and

DESCRIPTION OF THE PREFERRED EMBODIMENT(S)

Figure 3:
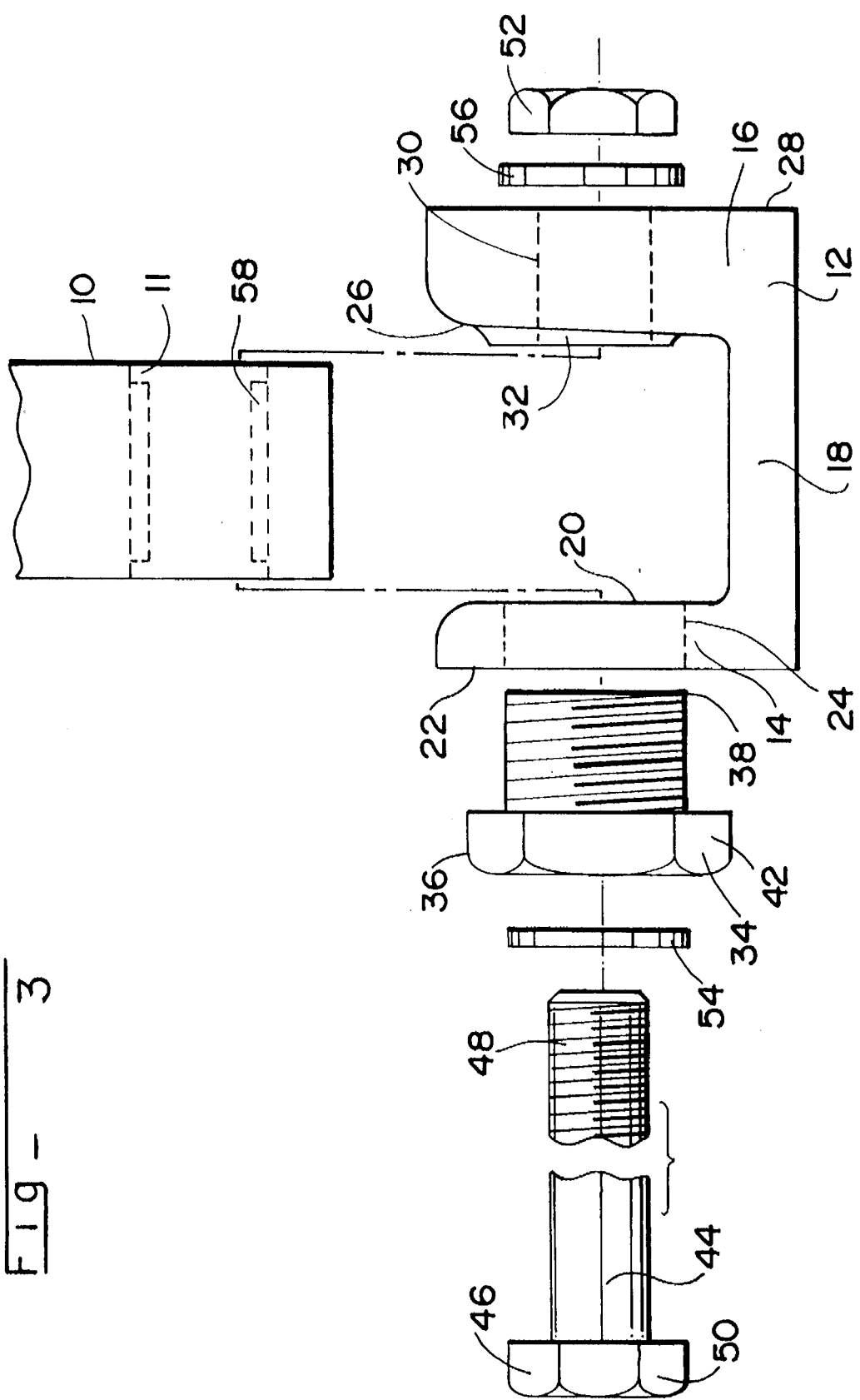
FIG. 3 is an exploded view of the apparatus of FIG. 1.

With combined reference to FIGS. 1, 2 and 3, a fastening apparatus manufactured in accordance with the present invention is shown fastened to a mounting projection 10. Mounting projection 10 may be a projection from, e.g., an electric motor for an automobile, and has hole 11 therein. Basically, the fastening apparatus includes three parts: clevis 12; clamping plug 34; and a fastening means, such as bolt 44, which holds it all together. Clevis 12 which may for instance, be a part of a rigid crossmember in an automobile. Clevis 12 includes proximal flange 14, distal flange 16, and web 18 connecting proximal flange 14 to distal flange 16.

Proximal flange 14 has inner side 20 facing distal flange 16, outer side 22 opposite inner side 20, and screw-threaded hole 24 therethrough. Distal flange 16 has inner side 26 facing proximal flange 14, outer side 28 opposite inner side 26, and hole 30 therethrough. Hole 30 in distal flange 16 has a smaller diameter than hole 24 in proximal flange 14.

Distal flange 16 is shown having raised portion 32 on inner side 26. Typically, if clevis 12 is part of a automobile crossmember, it is formed by casting or forging and a nipple remains on a surface such as inner side 26. The nipple is then machined to be smooth and perpendicular to the hole in the flange.

The fastening apparatus shown in FIGS. 1–3 also includes clamping plug 34. Clamping plug 34 is cylindrical and has proximal end 36, distal end 38, and axial bore 40 extending from proximal end 36 to distal end 38. Distal end 38 of clamping plug 34 is screw threaded on its exterior surface to mate with the screw threading in hole 24 of proximal flange 14.

The length of clamping plug 34 is such that, when it is inserted in hole 24 of proximal flange 14 and abuts mounting projection 10, clamping plug 34 extends beyond outer side 22 of proximal flange 14 and head 42 of clamping plug 34 does not contact outer side 22 of proximal flange. Such a length ensures that there is zero clearance between distal end 38 of clamping plug 34 and mounting projection 10 in order to achieve a good clamping effect.

The fastening apparatus further includes bolt 44 having proximal end 46 and screw-threaded distal end 48. Proximal end 46 has head 50 thereon. Head 50 is larger in diameter than axial bore 40 through clamping plug 34. Axial bore 40 in clamping plug 34 has a slightly larger diameter than the diameter of the rod portion of bolt 44, e.g., about a 1 mm difference.

The length of bolt 44 is such that it extends through clamping plug 34 (which has been inserted into hole 24 of proximal flange 14), through hole 11 in 20 mounting projection 10, and through and beyond hole 30 in distal flange 16. To retain bolt 44 in position, nut 52 is screwed onto distal end 48 of bolt 44. Washer 54 is placed between head 50 of bolt 44 and head 42 of clamping plug 34 for a more secure fit. Washer 56 is placed between nut 52 and outer side 28 of distal flange 16, also for a more secure fit.

Instead of using washer 56 and nut 52, hole 30 in distal flange 16 could be threaded matingly with distal end 48 of bolt 44, and bolt 44 could then be screwed into hole 30 to secure it in place.

Bushing 58 is shown in hole 11 of mounting projection 10 around bolt 44. Bushing 58 may be metallic, e.g., aluminum, or non-metallic, e.g. polymeric.

All parts of the fastening apparatus may be metal or another suitable material that is known in the art. The clamping plug is preferably formed of aluminum or steel.

To fasten mounting projection 10 to clevis 12, first optional bushing 58 is inserted inside hole 11 of mounting projection 10 and clamping plug 34 is partially screwed into hole 24 in proximal flange 14 of clevis 12. Mounting projection 10 is then positioned between flanges 14 and 16 of clevis 12 so that hole 11 of mounting projection 10 is aligned with holes 24 and 30 of flanges 14 and 16, respectively. Washer 54 is then placed on bolt 44 and bolt 44 is then inserted into clamping plug 34, hole 11 of mounting projection 10, and hole 30 of distal flange 16. Clamping plug 34 is then tightened with a nominal load to clamp against mounting projection 10. Washer 56 is then placed on distal end 48 of bolt 44 and nut 52 is screwed tightly onto distal end 48 with a load of, e.g., 8,000–12,000 pounds, for a secure fastening.

Accordingly, the clamping plug and the fastening apparatus (which includes a clevis) of the present invention preclude the need to deflect the flanges of the clevis in order to achieve a secure fit between two parts and allow greater tolerances on the distance between the flanges of the clevis. In addition, the threaded clamping plug of the present invention is easily backed out of the hole in the proximal flange if it is desired to remove the mounting projection from the clevis.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A clamping apparatus used for improving the fastening of a mounting projection between proximal and distal flanges of a clevis, the proximal flange having a hole, an inner side facing the distal flange, and an outer side opposite the inner side, the clamping apparatus allowing tolerance on the distance between the two flanges yet reducing the need for deflecting the flanges of the clevis in order to achieve a secure fit between the mounting projection and the clevis, the clamping apparatus comprising:

a threaded clamping plug being sized to fit in the hole in the proximal flange of the clevis and to be tightened against the mounting projection yet not abut the outer side of the proximal flange when the clamping plug is in the hole in the proximal flange and the mounting projection is between the two flanges.

2. The clamping apparatus of claim 1, wherein the clamping plug has an axial bore therethrough.

3. The apparatus of claim 1, wherein the clamping plug has a distal end with exterior screw threading and a proximal end with a head thereon, which head does not abut the outer side of the proximal flange when the clamping plug is assembled with the clevis, the mounting projection is between the two flanges, and the clamping plug is tightened against the mounting projection.

4. A clamping apparatus used for improving the fastening of a mounting projection between proximal and distal flanges of a clevis, the proximal flange having a hole, an inner side facing the distal flange, and an outer side opposite the inner side, the clamping apparatus allowing tolerance on the distance between the two flanges yet reducing the need for deflecting the flanges of the clevis in order to achieve a secure fit between the mounting projection and the clevis, the clamping apparatus comprising:

a clamping plug having a proximal end with a head thereon, a distal end with exterior screw threading, and an axial bore therethrough, the clamping plug being sized so that, when the clamping plug is in the hole in the proximal flange and the mounting projection is between the two flanges and the clamping plug is tightened against the mounting projection, the clamping plug extends beyond the outer side of the proximal flange so that the head does not abut the outer side of the proximal flange.

5. An apparatus for fastening a mounting projection to a structure, the mounting projection having a hole therethrough, the apparatus comprising:

a clevis attached to the structure, the clevis having a proximal flange and a distal flange, the proximal flange having a hole, an inner side facing the distal flange, and an outer side opposite the inner side, the distal flange having a hole, an inner side facing the proximal flange, and an outer side opposite the inner side, the hole in the distal flange of the clevis having a smaller diameter than the hole in the proximal flange of the clevis;

a threaded clamping plug being sized to fit in the hole in the proximal flange of the clevis and to abut the mounting projection when the clamping plug is in the hole in the proximal flange and the mounting projection is between the two flanges; and fastening means to urge against the proximal end of the clamping plug and the outer side of the distal flange of the clevis.

6. The apparatus of claim 5, wherein the hole in the proximal flange of the clevis is screw-threaded.

7. The clamping apparatus of claim 5, wherein the clamping plug has an axial bore therethrough.

8. The clamping apparatus of claim 5, wherein, when the clamping plug is in the hole in the proximal flange and the mounting projection is between the two flanges, the clamping plug has a length such that it extends beyond the outer side of the proximal flange while it abuts the mounting projection.

9. The apparatus of claim 5, wherein the clamping plug has a distal end with exterior screw threading and a proximal end with a head thereon, which head does not abut the outer side of the proximal flange when the clamping apparatus is assembled with the clevis and abuts the mounting projection.

10. The apparatus of claim 5, wherein the fastening means is a bolt having a proximal end and a distal end, the bolt being provided for passing (a) through the clamping plug when the clamping plug is in the hole in the proximal flange, (b) through the hole in the mounting projection, and (c) through the hole in the distal flange.

11. The apparatus of claim 10, wherein the clamping plug has an axial bore therethrough and the bolt is screw-threaded on its distal end and has a head on its proximal end, which head has a larger diameter than the axial bore through the clamping plug, the bolt having a length such that it extends through the hole in the distal flange and beyond the outer side of the distal flange, and the apparatus further comprises a nut securable to the screw-threaded distal end of the bolt.

12. An apparatus for fastening a mounting projection having a hole therethrough to a structure, comprising:

a clevis attached to the structure, the clevis having a proximal flange and a distal flange, the proximal flange having an inner side facing the distal flange and an outer side opposite the inner side and a screw-threaded hole therethrough and the distal flange having a hole, the hole in the distal flange having a smaller diameter than the hole in the proximal flange, the holes in the mounting projection and in the proximal and distal flanges being located such that, when the mounting projection is between the flanges of the clevis for fastening, the hole in the mounting projection aligns with the holes in the flanges so that a bolt may be passed through the hole in the proximal flange, through the hole in the mounting projection, and into the hole in the distal flange;

a clamping plug having a proximal end and a distal end and an axial bore extending from the proximal end to the distal end, the proximal end having a head thereon, the exterior of the distal end being screw threaded, the outer diameter of the clamping plug being sized to fit in the hole in the proximal flange of the clevis, the length of the clamping plug being such that, when the apparatus is assembled with the mounting projection between the flanges of the clevis and the clamping plug has been inserted into the hole of the proximal flange, the distal end of the clamping plug abuts the mounting projection and the head of the clamping plug does not abut the outer side of the proximal flange; and a bolt having a proximal end and a screw-threaded distal end, the proximal end of the bolt having a head thereon, the head on the bolt having a larger diameter than the axial bore through the clamping plug, the bolt having a length and diameter such that the bolt may fit through the bore of the clamping plug, through the hole in the mounting projection, and through the hole of the distal flange of the clevis.

13. An apparatus for fastening a mounting projection to a structure, the mounting projection having a hole therethrough, the apparatus comprising:

a clevis attached to the structure, the clevis having a proximal flange and a distal flange, the proximal flange having a hole, an inner side facing the distal flange, and an outer side opposite the inner side, the distal flange having a hole, an inner side facing the proximal flange, and an outer side opposite the inner side;

a threaded clamping plug being sized to fit in the hole in the proximal flange of the clevis and to be tightened against the mounting projection yet not abut the outer side of the proximal flange when the clamping plug is in the hole in the proximal flange and the mounting projection is between the two flanges; and fastening means to urge against the proximal end of the clamping plug and the outer side of the distal flange of the clevis when the clamping plug is tightened against the mounting projection to thereby further securely clamp the mounting projection between the flanges of the clevis.

14. The apparatus of claim 13, wherein the hole in the proximal flange of the clevis is screw-threaded.

15. The clamping apparatus of claim 13, wherein the clamping plug has an axial bore therethrough.

16. The clamping apparatus of claim 13, wherein, when the clamping plug is in the hole in the proximal flange and the mounting projection is between the two flanges, the clamping plug has a length such that it extends beyond the outer side of the proximal flange while it is tightened against the mounting projection.

17. The apparatus of claim 13, wherein the clamping plug has a distal end with exterior screw threading and a proximal end with a head thereon, which head does not abut the outer side of the proximal flange when the clamping apparatus is assembled with the clevis, the mounting projection is between the flanges of the clevis, and the clamping plug is tightened against the mounting projection.

18. The apparatus of claim 13, wherein the fastening means is a bolt having a proximal end and a distal end, the bolt being provided for passing (a) through the clamping plug when the clamping plug is in the hole in the proximal flange, (b) through the hole in the mounting projection, and (c) through the hole in the distal flange.

19. The apparatus of claim 18, wherein the clamping plug has an axial bore therethrough and the bolt is screw-threaded on its distal end and has a head on its proximal end, which head has a larger diameter than the axial bore through the clamping plug, the bolt having a length such that it extends through the hole in the distal flange and beyond the outer side of the distal flange, and the apparatus further comprises a nut securable to the screw-threaded distal end of the bolt.

20. An apparatus for fastening a mounting projection having a hole therethrough to a structure, comprising:

a clevis attached to the structure, the clevis having a proximal flange and a distal flange, the proximal flange having an inner side facing the distal flange and an outer side opposite the inner side and a screw-threaded hole therethrough and the distal flange having a hole, the holes in the mounting projection and in the proximal and distal flanges being located such that, when the mounting projection is between the flanges of the clevis for fastening, the hole in the mounting projection aligns with the holes in the flanges so that a bolt may be passed through the hole in the proximal flange, through the hole in the mounting projection, and into the hole in the distal flange;

a clamping plug having a proximal end and a distal end and an axial bore extending from the proximal end to the distal end, the proximal end having a head thereon, the exterior of the distal end being screw threaded, the outer diameter of the clamping plug being sized to fit in the hole in the proximal flange of the clevis, the length of the clamping plug being such that, when the apparatus is assembled with the mounting projection between the flanges of the clevis and the clamping plug has been inserted into the hole of the proximal flange and the distal end of the clamping plug is tightened against the mounting projection, the head of the clamping plug does not abut the outer side of the proximal flange; and a bolt having a proximal end and a screw-threaded distal end, the proximal end of the bolt having a head thereon, the head on the bolt having a larger diameter than the axial bore through the clamping plug, the bolt having a length and diameter such that the bolt may fit through the bore in the clamping plug, through the hole in the mounting projection, and through the hole in the distal flange of the clevis.

* * * * *